UNITED STATES PATENT OFFICE.

JOHN J. LUDI, OF SANTA FÉ, NEW MEXICO.

IMPROVEMENT IN DISINTEGRATING SOLUTION FOR GOLD AND SILVER BEARING ORES.

Specification forming part of Letters Patent No. 188,744, dated March 27, 1877; application filed December 26, 1876.

*To all whom it may concern:*

Be it known that I, JOHN J. LUDI, of the city and county of Santa Fé, in the Territory of New Mexico, have discovered a new and Improved Disintegrating Solution for Treating Gold and Silver Bearing Ores preliminary to the usual process of amalgamation, which is fully set forth in the following specification.

This invention relates to that class of solutions into which gold and silver bearing ores are discharged in a highly-heated condition for the purpose of disintegrating, and thus rendering them easy to amalgamate.

To prepare the bath or solution, take eighty-five (85) gallons of water, fourteen (14) gallons of strong vinegar, thirty (30) pounds of salt, two ounces of sulphuric acid, three (3) ounces of nitric acid, four (4) ounces of caustic potash, and boil down to ninety-five (95) gallons. The ores to be treated are thrown into the bath thus prepared in a highly-heated condition, and after being left therein for a few minutes—until cold—are withdrawn and further treated by any of the usual amalgamation processes.

I claim as my invention—

A disintegrating solution for gold and silver bearing ores, consisting of salt, vinegar, sulphuric and nitric acids, caustic potash, and water, prepared substantially in the manner herein set forth.

JOHN J. LUDI.

Witnesses:
    WILLIAM C. HAZLEDINE,
    WM. BREEDEN.